Patented Nov. 29, 1949

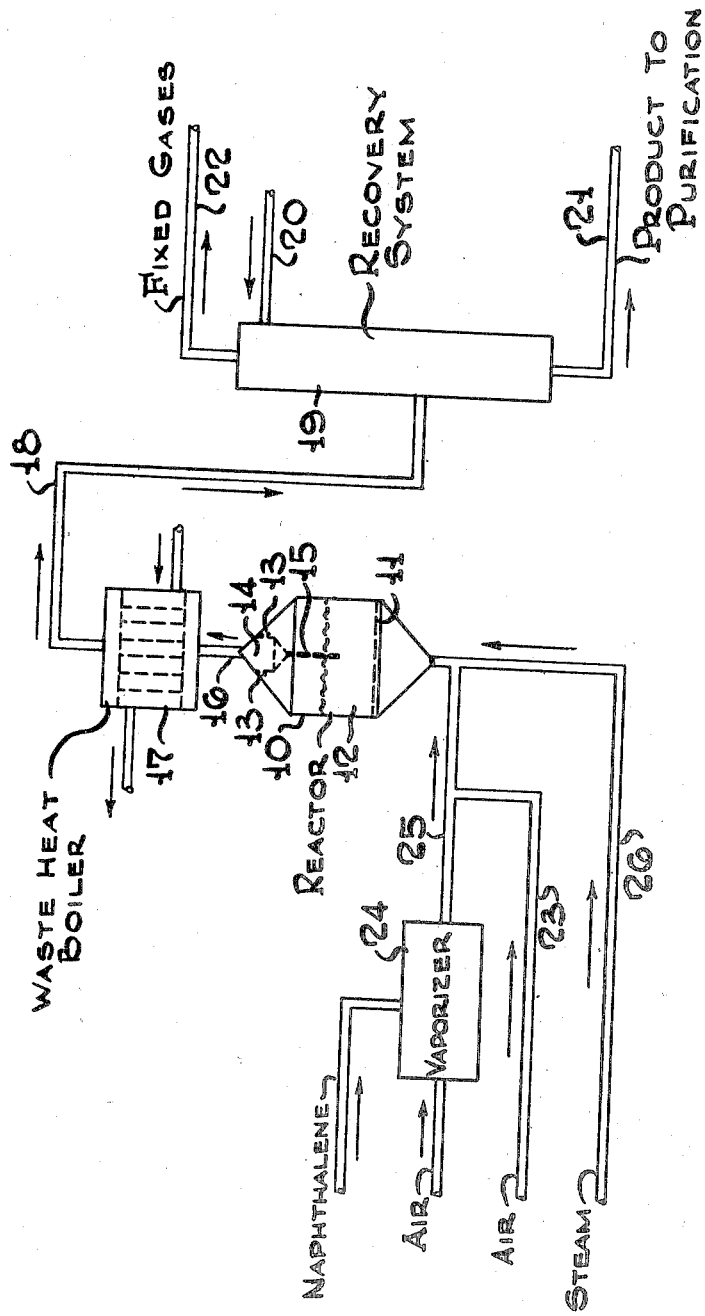

2,489,346

UNITED STATES PATENT OFFICE 2,489,346

OXIDATION PROCESS

Albert B. Welty, Jr., Mountainside, and Walter F. Rollman, Cranford, N. J., assignors to Standard Oil Development Company, a corporation of Delaware Application August 11, 1945, Serial No. 610,344

15 Claims. (Cl. 260—342)

1

This invention relates to an improved method and apparatus for the oxidation of aromatic hydrocarbons and pertains more particularly to the manufacture of phthalic anhydride.

The oxidation of aromatic hydrocarbons, such as naphthalene and orthoxylene, to phthalic anhydride and maleic anhydride is a well known process. In the usual process, a mixture of the aromatic hydrocarbon and air is passed through a bed of an oxide catalyst, such as vanadium oxide at a temperature between 570° and 1200° F. Because of the exothermic nature of the reaction, it has been difficult to properly control the temperature of the reaction zone and prevent the formation of "hot spots" and local overheating. It has recently been proposed to overcome these difficulties by effecting the oxidation by means of a finely divided solid or powdered catalyst maintained as a turbulent dense phase mass in the air used for oxidation. Even with this technique it has not been found possible to operate without the use of heat exchangers within the reaction zone to remove the excess heat of reaction. However, mechanical difficulties are sometimes encountered in incorporating sufficient heat exchange surfaces to accomplish the desired results within the limited space available.

It is, therefore, the principal object of this invention to provide a method and apparatus for the oxidation of aromatic hydrocarbons by means of a finely divided catalyst wherein the excess heat of reaction is removed in a simpler and more economical manner.

A further object of this invention is to provide a method for oxidizing aromatic hydrocarbons in which the use of heat exchanger surfaces within the reaction zone is avoided.

It is still a further object of this invention to decrease the cost of manufacturing phthalic anhydride and maleic anhydride and to increase the yields of these compounds from aromatic hydrocarbons.

Other objects of the invention will be apparent as the detailed description proceeds.

In practicing this invention the oxidation of the aromatic hydrocarbons is effected by means of a relatively coarse catalyst in the form of spheres in a reaction zone under oxidizing conditions, with air and hydrocarbon vapors flowing concurrently upward through the reaction zone. The flow of vapors and air is so controlled that the catalyst particles are constantly in motion and substantially uniform contact between catalyst and vapors is obtained. Loss of catalyst is prevented by providing cyclone separators above the reaction zone for recovering any catalyst particles which would otherwise leave the reaction zone with the reaction products, this separated catalyst being returned directly to the dense phase mass of catalyst in the reaction zone.

2

However, when using a relatively coarse catalyst, the use of cyclones is generally not necessary. The catalyst separate from the gases by gravity.

One of the main features of this invention is to remove the heat of reaction as sensible heat from the dense phase catalyst mass by the inclusion of a heat absorbing medium with the inlet vapors to the oxidation process and to recover the heat from the vapors in a waste heat boiler or by other conventional means.

It is a further feature of this invention to obtain maximum yields of desired reaction products by affording only brief contact of the reactant gases with the catalyst. This is accomplished according to the present invention by materially decreasing the depth of the catalyst mass and the use of coarse catalyst.

The invention will be more clearly understood from the following detailed description read in conjunction with the accompanying drawing which forms a part of this specification.

As charging stocks for the process of this invention, there may be used any suitable aromatic hydrocarbon or aromatic hydrocarbon stock such as coal tar distillates, refractory stocks produced by catalytic cracking or reforming, or pure aromatic hydrocarbons such as orthoxylene, naphthalene, alkyl naphthalenes, etc.

As catalysts for this process there may be employed 6th or 7th group metal oxides either supported or unsupported on suitable carriers such as alumina, silica gel, pumice, kieselguhr, corundum, or any other known catalyst supports. It is a particular feature of this invention to employ unsupported catalyst in the form of microspheres having a particle size between 10 and 60 mesh, preferably between 20 and 40 mesh. Such microspheres may be prepared in any well known manner. A suitable method consists in obtaining particles of approximately the desired size and then fusing them into spheres by dropping the particles through a heated quartz tube. This is accomplished by initially fusing the oxide either alone or in admixture with any desired promoter, for example, potassium sulfate, in a muffle furnace and pouring the resulting melt onto a quartz surface where it is allowed to cool in thin sheets. The crystallized oxide is then ground and screened and particles of the desired size are fed slowly through a quartz tube heated to 1700°–1800° F. The melted particles are then solidified by a free fall of several feet through cool air. The cooled spheres thus formed are collected and screened to size.

The process will now be described in connection with the use of a fused spherical vanadium oxide catalyst of 20–40 mesh for the preparation of phthalic anhydride from naphthalene although it is to be understood that the invention is not limited to any particular catalyst composition or preparation, or to the oxidation of any particular feed stock.

Referring, therefore, to the drawing, there is provided a reactor 10 in the bottom of which is located distribution grid 11 on which is placed a shallow layer of catalyst 12. In or above the top of the reactor there is placed one or more cyclone separators for removing any catalyst particles which might be entrained in the gases leaving the reactor. Thus gases from the top of the reactor may be introduced by inlet ports 13 to separator 14 which is provided with a dip leg 15 extending into the dense phase catalyst 12. Gases from the cyclone 14 may be passed through one or more additional cyclone stages or they may be withdrawn through line 16. The catalyst-free reaction products are passed through waste heat boiler 17 or other heat exchanger and used to generate process steam. Cooled gases and reaction products are then introduced through line 18 to recovery tower 19 where they are scrubbed with water introduced through line 20. A solution of phthalic and maleic anhydrides is removed through line 21 and fixed gases are taken overhead through line 22. Relatively pure phthalic anhydride may be separated from the conversion products by conventional processes of distillation, crystallization, etc.

Air is introduced into reactor 10 through line 23 at a pressure of 15 to 30 lbs. per sq. in. Naphthalene vapors plus air are introduced from vaporizer 24 through line 25 and mixed with the air in line 23 in amounts of about 0.5 to 2.0 mol per cent, preferably about 0.8 mol per cent naphthalene in total air. Low temperature steam, for example refinery exhaust steam, or liquid water, is introduced through line 26 and mixed with the air and naphthalene prior to their introduction into the reactor in such amounts that the sensible heat of the total mixture plus the latent heat of vaporization of liquid water present, if any, equals the heat of reaction at the desired temperature head. At a feed concentration of 0.8 mol per cent naphthalene in air alone, about 50–65 mol per cent steam based on total inlet vapor will be required. The reaction temperature should be maintained between 900° and 1100° F., preferably about 1050° F. and may be closely controlled by varying the steam content of the inlet vapors. The vertical gas velocity in the reactor should be about 1 to 10 ft. per second, preferably 2 ft. per second. At such velocities the catalyst particles will be in motion but generally will not be entrained in the gases leaving the reactor. The heat liberated in the reaction is removed by the sensible heat of the entering vapors as described above. Remarkably close temperature control may thus be provided by varying steam content. The addition of steam in such large quantities with the feed and air forms an important feature of this invention and allows the process to be carried out without the use of any heat exchange surfaces in the reaction zone thus materially simplifying reactor construction.

An important feature of the invention is the very short contact time within the reactor which may range from 0.1 to 1 second, which is a condition generally difficult to meet within conventional fluid catalyst equipment. Optimum yields of phthalic anhydride are obtained with a contact time between 0.1 and 1 second, e. g. 0.5 second. A very convenient method of achieving this short contact time is by the use of relatively shallow catalyst masses. The depth of the catalyst mass may range from 3 to 36 inches and is preferably on the order of 14 inches.

The following data illustrate the unexpected advantages obtained in the oxidation of naphthalene to form phthalic anhydride by using large quantities of steam to remove reaction heat, short contact times, shallow dense phase catalyst mass, and catalyst in the form of vanadium oxide microspheres of 20–40 mesh.

*Production of phthalic anhydride by catalytic vapor phase oxidation of naphthalene in presence and absence of added steam*

| Catalyst | Vanadium Oxide Microspheres | | | | |
| --- | --- | --- | --- | --- | --- |
| Size mesh | 20–40 | | | 40–60 | |
| Superficial Vapor Velocity, ft./sec | 2 | 2 | 2 | 1 | 1 |
| Steam, mol per cent of inlet vapor | 0 | 0 | 50 | 0 | 67 |
| Feed Con., mol per cent in air | 0.8 | 0.75 | 0.75 | 0.8 | 1.7 |
| Weight feed / Hr. / Wt. Cat. in Reactor | 0.2 | 0.2 | 0.1 | 0.3 | 0.2 |
| Contact Time, sec | 0.5 | 0.5 | 0.3 | 0.4 | 0.4 |
| Avg. Depth of Catalyst, in | 14 | 12 | 12 | .5 | 6 |
| Temperature, °F | 1,050 | 1,000 | 1,000 | 1,000 | 903 |
| Product Distribution: | | | | | |
| Total Acids, mol per cent | 96.5 | 93 | 94 | 85.8 | 84.2 |
| Phthalic Anhydride | 87 | 84 | 85 | 74.3 | 74.0 |
| Maleic Anhydride | 9.5 | 9 | 9 | 11.5 | 10.2 |
| Net $CO+CO_2$ | 2 | 5.5 | 5 | 6.0 | 10.9 |
| Conversion, per cent | 100 | 99.5 | 100 | 96.5 | 97.7 |
| Selectivity to Phthalic Anhydride, per cent | 87 | 84.5 | 85 | 77.0 | 75.7 |

From the above data it will be noted that steam has no significant effect on product distribution and since all internal heat exchange surfaces have been eliminated, the advantages of the use of steam as a means for removing exothermic heat of reaction are obvious.

While one specific process embodying the novel steps of the present invention, as well as one specific apparatus for carrying out the same has been described in considerable detail, it is to be understood that this description is illustrative only, and for the purpose of making the invention more clear, and it is not intended that the invention shall be construed as limited to details of the description except insofar as such limitations have been included in the terms of the following claims in which it is the intention to claim all novelty inherent in the process according to the present invention.

We claim:

1. The method of producing phthalic anhydride from an aromatic hydrocarbon by partial oxidation under controlled temperature conditions which method comprises passing an oxygen-containing gas, steam and said aromatic hydrocarbon in the vapor state upwardly through a bed of relatively coarse powdered oxidation catalyst in a reaction zone at such a vertical velocity as to maintain the catalyst particles in motion within said bed, maintaining the vapors in contact with the catalyst for a period of time between 0.1 second and 1.0 second and removing gases and vapors substantially free of catalyst particles from said catalyst bed.

2. Process according to claim 1 in which the catalyst is a shallow bed of spherical particles of vanadium oxide of 10 to 60 mesh.

3. Process according to claim 1 in which the catalyst is a shallow bed of spherical particles of vanadium oxide of 20 to 40 mesh.

4. The process of producing phthalic anhydride from a vaporizable aromatic hydrocarbon by partial oxidation which comprises passing an oxygen-containing gas, steam and a stream of said vaporizable aromatic hydrocarbon upwardly through a bed of spherical particles of an oxidation catalyst having a particle size between 10 and 60 mesh at a vertical gas velocity between 1 and 10 feet per second, said particles being kept in motion within said bed but not being entrained by the gases and vapors passing upwardly out from the bed, controlling the temperature of the catalyst within the range of 900° and 1100° F. and maintaining the vapors in contact with the catalyst for a period of time between 0.1 second and 1.0 second and removing gases and vapors substantially free of catalyst particles from above said catalyst bed.

5. The process of producing phthalic anhydride from a vaporizable aromatic hydrocarbon by partial oxidation which comprises passing an oxygen-containing gas and a stream of said vaporizable aromatic hydrocarbon upwardly through a bed of spherical particles of an oxidation catalyst at a vertical gas velocity sufficient to maintain the catalyst particles in motion within said bed but insufficient to entrain any substantial quantity of particles in the gases and vapors leaving the catalyst bed, maintaining the vapors in contact with the catalyst for a period of time between 0.1 second and 1.0 second, and removing gases and vapors substantially free of catalyst particles from above said catalyst bed.

6. The process of producing phthalic anhydride from a vaporizable aromatic hydrocarbon by partial oxidation which comprises passing an oxygen-containing gas and a vertically flowing stream of said vaporizable aromatic hydrocarbon upwardly through a bed of spherical particles of an oxidation catalyst, maintaining the catalyst particles continuously in motion within said bed, maintaining the vertically flowing vapors in contact with the catalyst for a period of time between 0.1 and 1.0 second, and removing gases and vapors substantially free of catalyst particles from above said catalyst bed.

7. Process of producing phthalic anhydride from a vaporizable aromatic hydrocarbon by partial oxidation which comprises passing an oxygen-containing gas and a stream of said vaporizable aromatic hydrocarbon upwardly through a bed of spherical particles of an oxidation catalyst, maintaining the vertical velocity of the gases and vapors passing through the catalyst bed in such relation to the particle size of the catalyst so as to keep the catalyst particles in motion without the loss of any substantial amount of the particles from the bed in the effluent gases and vapors leaving said bed, maintaining the vapors in contact with the catalyst particles for a period of time between 0.1 second and 1.0 second, and removing gases and vapors substantially free of catalyst particles from said catalyst bed.

8. The process of producing phthalic anhydride which comprises passing an oxygen-containing gas, steam and a stream of vaporized naphthalene upwardly through a bed of spherical particles of a vanadium oxide catalyst having a particle size between 10 and 60 mesh at a vertical gas velocity between 1 and 10 feet per second, said particles being kept in motion within said bed but not being entrained by the gases and vapors passing upwardly out from the bed, controlling the temperature of the catalyst within the range of 900° and 1100° F., and maintaining the vapors in contact with the catalyst for a period of time between 0.1 second and 1.0 second and removing gases and vapors substantially free of catalyst particles from above said catalyst bed.

9. Process according to claim 8 in which the spherical particles of vanadium oxide are between 20–30 mesh.

10. The process of producing phthalic anhydride which comprises passing an oxygen-containing gas and a stream of vaporized naphthalene upwardly through a bed of spherical particles of a vanadium oxide catalyst at a vertical gas velocity sufficient to maintain the vanadium oxide particles in motion within said bed but insufficient to entrain any substantial quantity of particles in the gases and vapors leaving the catalyst bed, maintaining the vapors in contact with the catalyst for a period of time between 0.1 second and 1.0 second, and removing gases and vapors substantially free of catalyst particles from above said catalyst bed.

11. Process according to claim 10 in which the spherical particles of vanadium oxide are between 20–30 mesh.

12. The process of producing phthalic anhydride which comprises passing an oxygen-containing gas and a vertically flowing stream of vaporized naphthalene upwardly through a bed of spherical particles of a vanadium oxide catalyst, maintaining the catalyst particles continuously in motion within said bed, maintaining the vertically flowing vapors in contact with the catalyst for a period of time between 0.1 and 1.0 second, and removing gases and vapors substantially free of catalyst particles from above said catalyst bed.

13. Process according to claim 12 in which the spherical particles of vanadium oxide are between 20–30 mesh.

14. Process of producing phthalic anhydride which comprises passing an oxygen-containing gas and a stream of vaporized naphthalene upwardly through a bed of spherical particles of a vanadium oxide catalyst, maintaining the vertical velocity of the gases and vapors passing through the catalyst in such relation to the particle size of the vanadium oxide catalyst so as to keep the catalyst particles in motion without the loss of any substantial amount of the particles from the bed in the effluent gases and vapors leaving the bed, maintaining the vapors in contact with the catalyst particles for a period of time between 0.1 second and 1.0 second, and removing gases and vapors substantially free of catalyst particles from said catalyst bed.

15. Process according to claim 14 in which the spherical particles of vanadium oxide are between 20–30 mesh.

ALBERT B. WELTY, Jr.
WALTER F. ROLLMAN.

REFERENCES CITED

The following references are of record in the file of this patent:

UNITED STATES PATENTS

| Number | Name | Date |
|---|---|---|
| 1,909,354 | Jaeger | May 16, 1933 |
| 1,956,482 | Zumstein | Apr. 24, 1934 |
| 2,215,095 | Drossbach | Sept. 17, 1940 |
| 2,366,372 | Voorhees | Jan. 2, 1945 |
| 2,374,518 | Wolk et al. | Apr. 24, 1945 |
| 2,384,946 | Marisic | Sept. 18, 1945 |